United States Patent [19]

Schrofer

[11] Patent Number: 4,682,284

[45] Date of Patent: Jul. 21, 1987

[54] QUEUE ADMINISTRATION METHOD AND APPARATUS

[75] Inventor: Eldred P. Schrofer, Batavia, Ill.

[73] Assignee: American Telephone & Telegraph Co., AT&T Bell Lab., Murray Hill, N.J.

[21] Appl. No.: 678,898

[22] Filed: Dec. 6, 1984

[51] Int. Cl.[4] .................... G06F 12/00; G11C 29/00
[52] U.S. Cl. ..................................... 364/200; 371/21
[58] Field of Search .................. 371/21, 38, 51; 324/200, 900; 365/221

[56] References Cited

U.S. PATENT DOCUMENTS

| | | | |
|---|---|---|---|
| 4,041,460 | 8/1977 | Wisdom et al. | 364/900 |
| 4,272,819 | 6/1981 | Katsumata et al. | 364/200 |
| 4,297,567 | 10/1981 | Herzner | 235/92 PB |
| 4,318,172 | 3/1982 | Yamada et al. | 364/200 |
| 4,345,309 | 8/1982 | Arulpragasam et al. | 364/200 |
| 4,363,093 | 12/1982 | Davis et al. | 364/200 |
| 4,366,538 | 12/1982 | Johnson et al. | 364/200 |
| 4,493,019 | 1/1985 | Kim et al. | 364/200 |
| 4,507,760 | 3/1985 | Fraser | 365/221 |

FOREIGN PATENT DOCUMENTS

WO84/00835  3/1984  PCT Int'l Appl.

Primary Examiner—Charles E. Atkinson
Attorney, Agent, or Firm—David Volejnicek

[57] ABSTRACT

A memory subcontroller (203) of a computer (100) includes a queue (301) for storing read and write requests issued by memory using units (101-103) to a memory (104), apparatus (303, 304) for executing requests on the memory, and a circuit (302) for administering the queue. When the queue is empty and the executing apparatus is ready to receive a request for execution, a request incoming from a using unit bypasses the queue: it is received by the executing apparatus directly and is not stored in the queue. Otherwise, the queue administration circuit stores the request in the queue and then awaits results of validity checks on the stored request. If the request is found to be invalid, generally the administration circuit discards the request from the queue by freeing the queue location (210) or locations that store the invalid request to store the next received request. The invalid request is then overwritten by the next received request.

33 Claims, 7 Drawing Figures ical Field

This invention relates to storage control procedures and circuits generally, and in particular relates to methods of and apparatus for queue administration in computing systems.

BACKGROUND OF THE INVENTION

In processing systems, a queue is commonly used to store a backlog of tasks that have been assigned to a unit of the system by other system units. A queue is implemented as memory, or a portion of a memory, in which items of information—queue entries—are stored in the order in which they are received from the task requesting units, and from which they are retrieved in the same order by the task performing unit.

Two implementations of queues are common. One is a first-in, first-out (FIFO) memory, having the property that an item of information loaded into its input register which is located at the tail end of the queue automatically propagates—falls through—empty memory locations toward the output register located at the head end of the queue, and is stored in the first empty location closest to the output register. Retrieval of an item of information from the output register causes all items remaining in the FIFO to shift one location closer to the output register. The other common implementation is a circular buffer having a read and a write pointer associated therewith. The read pointer indicates the location at the head end of the queue from which the next item of information is to be retrieved and the write pointer indicates the location at the tail end of the queue into which the next item of information is to be stored. Retrieval of an item causes the read pointer to point to the next consecutive location that holds information, while storage of an item of information causes the write pointer to point to the next consecutive free location, available for information storage.

In conventional processing systems, task requestors and the task performer are allowed to communicate through the queue only. That is, a task requestor may not transfer a task to the task performer directly, by bypassing the queue, even when the task performer is idle and awaiting receipt of a task. The process of storing a task in the queue, then either propagating it through the FIFO queue or changing the pointers on a circular buffer queue, and finally retrieving a task from queue, takes time, and hence the system is slowed down by these procedures and its performance is adversely affected.

Furthermore in conventional systems, validity checks, such as error checks, on the information intended for queue storage are generally performed before the information is stored in the queue, so that only valid information is stored in the queue. Since queue storage space is generally limited in quantity and hence valuable, this has the desirable property that invalid information does not occupy, and hence waste, valuable queue storage space. Again, however, in the case where the task performer is idle and awaiting receipt of a task, system performance is adversely affected because the task performer must await the results of the validity check, in addition to the above-described delays associated with the queue, before it can begin to process the task.

Finally, should an item of information be invalidated for some reason after it has been stored in the queue of a conventional system, means are generally not provided for immediately removing the invalid information from the queue. Rather, the invalid item of information remains in the queue and occupies valuable queue storage space as any other item until it progresses to the head of the queue and is retrieved therefrom.

In summary, then, conventional queue administration systems are often not efficient in transferring information between devices that store information in the queue and devices that retrieve information from the queue, and in handling validity checks of queue information and disposal of invalid queue information.

SUMMARY OF THE INVENTION

This invention is directed to solving these and other disadvantages of the prior art. According to the invention, a queuing arrangement that includes a storage apparatus organized as a queue and including a plurality of storage locations for holding queue entries and apparatus for storing a queue entry in at least one location at the tail end of the queue, further includes an arrangement for determining the validity of the entry stored at the tail end and apparatus for freeing the at least one location if it is determined to hold an invalid tail end entry, to hold another queue entry. Stored queue entries are retrieved, for example for processing from the head end of the queue when the queue is not empty, and preferably the queue is bypassed and entries for processing are obtained directly when the queue is empty.

According to an embodiment of the invention, a system has a resource, such as a shared memory, and at least one using unit issuing tasks, such as memory read and write requests, to the resource. The system further includes a control apparatus for interfacing the resource with the at least one unit. The control apparatus has storage apparatus organized as a queue and including a plurality of storage locations for holding resource tasks. Additionally it has apparatus for storing a task received from a unit in a free at least one location at the tail end of the queue. It also has an arrangement for determining whether the task stored at the tail end is invalid. It further has apparatus for freeing the at least one location at the tail end that is holding an invalid task to store another received task. Finally, it has apparatus for retrieving a stored task from the head end of the queue, for execution on the resource. Accordingly, a method of queue administration in a system that has a resource and at least one unit issuing tasks to the resource involves the steps of storing a resource request received from a unit in a free at least one location at the tail end of the queue, determining whether the request stored at the tail end is invalid, and freeing the at least one location holding a tail end request determined to be invalid to store another received request. The method illustratively further includes the steps of retrieving a stored request from the head end of the queue, and executing the retrieved request on the resource.

Advantageously, the apparatus and method as described provide for storage of information in the queue before validity checks thereon are completed, for example immediately upon receipt by the queue of the information. The time spent in awaiting the validity check results is not wasted but is used to store the information in the queue. Hence information determined to be valid is already stored in the queue, and is therefore immediately available in the queue, for example for retrieval therefrom, upon the validity check results becoming known. Further advantageously, if the stored information is found to be invalid, it is generally not allowed to remain in the queue and occupy valuable space but is discarded therefrom, and the queue location or locations that it occupies are freed to hold other information.

Illustratively, each queue entry has at least one part and each location holds one entry part. Preferably, the control apparatus also includes a pointer to the first free location at the queue's tail end. The storing apparatus stores a part of the queue entry in the location pointed to by the pointer to the tail end; the determining arrangement determines the validity of the stored part; and the freeing apparatus causes the pointer to the tail end to point to the next free tail end location when the stored part is determined to be valid, and causes the pointer to the tail end to point to the location holding the first part of the entry when the part is determined to be invalid. Hence if the stored part that is determined to be invalid is the first part of the entry, the pointer to the tail end is caused to remain pointing to the same location. Preferably, the control apparatus further includes a pointer to the first location holding an entry part at the head end of the queue; and the retrieving apparatus includes apparatus for retrieving an entry part from the location pointed to by the pointer to the head end, and apparatus responsive to the retrieval for causing the pointer to the head end to point to the next location holding an entry part at the head end.

Not only does this illustrative embodiment possess the advantages enumerated previously; furthermore, the manner of freeing of the locations that hold an entry that is determined to be invalid is fast and simple, requiring either only a change in the value of the tail end pointer or no action at all, i.e., not updating the tail end pointer, in the case of an invalid first part of an entry.

According to an aspect of the invention, the system described previously further includes an apparatus for determining whether the queue is empty, and apparatus for executing tasks on the resource, which apparatus is coupled to the retrieving apparatus for receiving therefrom retrieved tasks for execution and which apparatus is also arranged to receive tasks for execution from the requesting units directly, i.e., not through the queue. The executing apparatus causes the retrieving apparatus to retrieve a stored request when the determining apparatus finds the queue not empty, but receives a resource request directly from a using unit and causes the storing apparatus not to store the received request when the determining apparatus finds the queue empty. Hence a task is enabled to bypass the queue and reach the task executor directly from the task requestor, thereby advantageously avoiding the loss of time involved in the idle task executor waiting for the task to be first stored in and then retrieved from the queue.

These and other advantages of the present invention will become more apparent during the following description of an illustrative embodiment of the invention considered together with the drawing.

DETAILED DESCRIPTION

Figure 1:
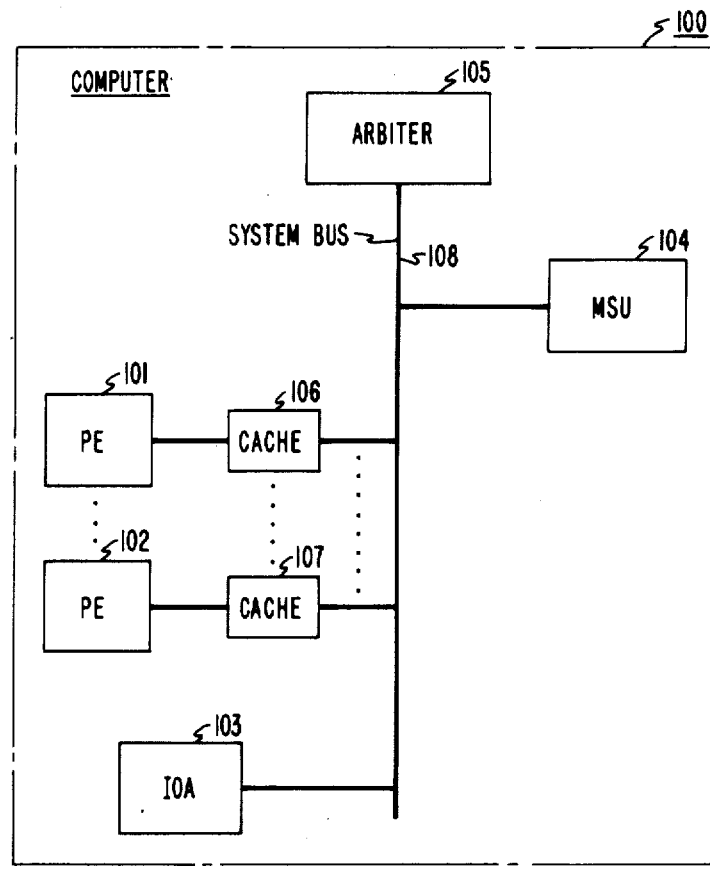
FIG. 1 is a block diagram of a computing system including an illustrative embodiment of the invention.

FIG. 1 shows in block diagram form an illustrative computer 100 comprised of a plurality of functional units 101-107 interconnected for communication by a system bus 108. The computer 100 is a multiprocessor system: the functional units 101-102 include a plurality of processing elements 101-102, which are for example microprocessors and which together form what may be referred to as the central processing unit of the computer 100. Each processing element 101-102 has its own cache memory unit 106-107, respectively. The cache memory units interface their respective processing elements' requests for information to the system bus 108. The functional units also include an input and output (I/O) adapter 103, which interfaces peripheral equipment (not shown) to the system bus 108.

A main store unit 104 provides the main on-line memory capability of the computer 100. The processing elements 101-102 and the I/O adapter 103 make use of the memory as a resource. They issue tasks to the main store unit 104 via the system bus 108. In turn, the main store unit 104 stores data received from the units 101-103 and returns requested data to the initiating unit 101-103 via the system bus 108.

Accesses by units to the bus 108 and data transfers between units on the system bus 108 are made under the control of a system bus arbiter 105. A unit wishing to communicate on the bus 108 requests a bus cycle from the arbiter 105. When the bus cycle is granted, the requesting unit becomes the "master" and is able to address any other unit in the system as the "slave". In the case of those bus transactions which require a response (e.g., memory read operations), when the slave is ready to respond (e.g., obtains the requested information), it assumes the role of "master" and initiates the transfer of information to the requesting unit.

The system bus 108 can be used for byte, half word, single, double, quad-word and read-modify-write (RMW) transactions. Read-modify-write, byte, half word, and word transactions all occupy one system bus cycle. Read request transactions involve transfer of address, command, request source identification (ID), and request destination ID, but not data. Byte, half word, and word write transactions, and RMWs involve transfer of address, command, request and source IDs, and one word of data, during one bus cycle. Double word write requests occupy two consecutive bus transfers, with the address, command, and ID portions of the transaction transferred during the first bus cycle and the two words of data transferred during the second bus cycle. Quad-word writes occupy three consecutive system bus cycles. The address, command, and ID portions of the transaction are transferred during the first bus cycle and the data portions are transferred during the second and third bus cycles.

During memory request transactions, the cache memory units 106-107 of all processing elements 101-102 must not be busy so that they may examine the transaction on the system bus 108 to determine whether the transaction affects any of their contents. The system bus arbiter 105 monitors the transactions occurring on the system bus 108, and when it determines that a transaction is a memory request, it checks "busy" signal lines of the bus 108 that are associated with the cache memory units 106-107 to determine whether any one or more of the units 106-107 are busy and hence unable to examine the bus transaction. If one or more of the "busy" lines of the units 106-107 are asserted, the arbiter 105 asserts a "busy abort" signal line of the bus 108 to cause the transaction to be invalidated and aborted.

The system bus arbiter 105 also makes all communication checks on transactions except for address range and alignment and invalid command, which are made by the destination units. The units on the system bus are not required to make any additional checks on the received information until it is used. When a transaction does not check out properly, the arbiter 105 asserts an "error abort" signal line of the bus 108 to cause the transaction to be invalidated and aborted.

Figure 2:
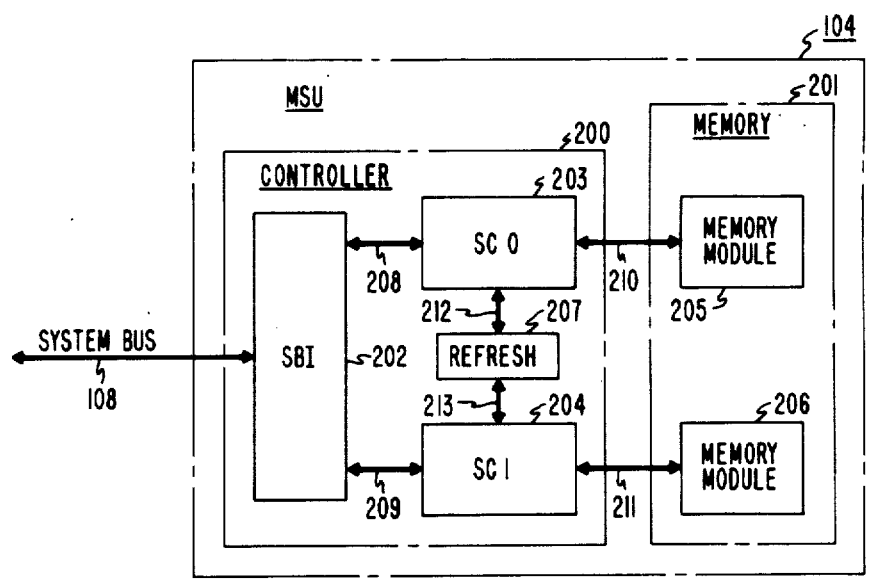
FIG. 2 is a block diagram of the main store unit of the system of FIG. 1.

Considering the main store unit 104 in greater detail, attention is turned to FIG. 2. FIG. 2 shows in block diagram form the internal structure of the main store unit 104. The main store unit 104 is functionally comprised of two parts: a memory 201 comprising the storage portion of the main store unit 104, and a memory controller 200 comprising circuits which administer the memory 201 and process the information storage and retrieval tasks that are given to the main store unit 104.

The memory controller 200 includes a system bus interface 202, which couples the main store unit 104 to the system bus 108, ensures that the main store unit 104 satisfies the communication protocol requirements of the bus 108, and performs some error checking on requests received by the main store unit 104. Coupled to the system bus interface 202 are two memory subcontrollers 203 and 204, to which the interface 202 forwards the received requests for processing over subcontroller buses 208 and 209, respectively.

Each subcontroller 203 and 204 has its own request queue (see FIG. 3), allowing the main store unit 104 to accept requests even though the subcontrollers are busy servicing other requests. The queues are first-in, first-out in nature; therefore requests to a given subcontroller are serviced in the order in which they are received by that subcontroller. Also, the system bus interface 202 includes an output queue (not shown) that permits the subcontrollers to begin servicing another request before the read reply data from previous read requests are returned to the requesting units.

The memory 201 is divided into two independent memory modules 205 and 206. Each subcontroller 203 and 204 controls an associated module 205 and 206, respectively, and independently services memory requests made to the associated module, over memory buses 210 and 211, respectively. The memory 201 may be subdivided into the memory modules 205 and 206 such that one memory module holds the lower half, and the other memory module holds the upper half, of the memory spectrum. Or the memory 201 may be quad-word interleaved, with adjacent blocks of four memory words held by different memory modules. In either case, the system bus interface 202 initiates processing of memory requests in the appropriate one of the subcontrollers 203 and 204 based on the address provided as part of the memory request.

The memory 201 is a dynamic random access memory (DRAM). Being volatile, it must periodically undergo refresh cycles to refresh the information stored in the memory locations. The refresh operations are performed by the memory subcontrollers 203 and 204 under direction of a refresh circuit 207 which is connected to the subcontrollers 203 and 204 by refresh buses 212 and 213, respectively. The refresh circuit 207 operates to periodically generate refresh command signals for interrupting subcontroller operation and causing them to perform a cycle of operation required for refreshing memory elements within the memory modules.

The general operation of the main store unit 104 is as follows. During each system bus cycle, the system bus interface 202 latches the contents of the system bus 108 and passes the contents to both subcontrollers 203 and 204. It then examines the latched contents and compares the destination code of the bus transaction with the destination code of the main store unit 104. If there is not a match, the contents of the system bus 108 are ignored. If there is a match, the system bus interface 202 acknowledges the transaction to the arbiter 105 via the system bus 108. At the same time, address alignment and range checks, and an invalid command check, are made by the system bus interface 202 on the memory request. The system bus interface 202 signals the arbiter 105 over the system bus 108 if it finds any errors, to which the arbiter 105 responds by asserting an "error abort" signal line of the system bus 108. This in turn causes the system bus interface 202 to assert an input error abort (IERABT) signal line of the buses 208 and 209. At this time, the arbiter 105 could also busy-abort the transaction, as was discussed previously, in response to which the system bus interface 202 would assert an input busy abort (IBYABT) signal line of the buses 208 and 209.

The system bus interface 202 also examines the address of the transaction to determine which one of the subcontrollers 203 and 204 is responsible for processing the transaction. The interface 202 selects the appropriate subcontroller based either on the most significant, or the quad-word interleaved, bit of the request address, depending on whether or not the array 201 is quad-word interleaved. The system bus interface 202 signals the appropriate subcontroller 203 or 204 to process the request by asserting a signal line GSBSC of either the bus 208 or 209 leading to that subcontroller.

Figure 3:
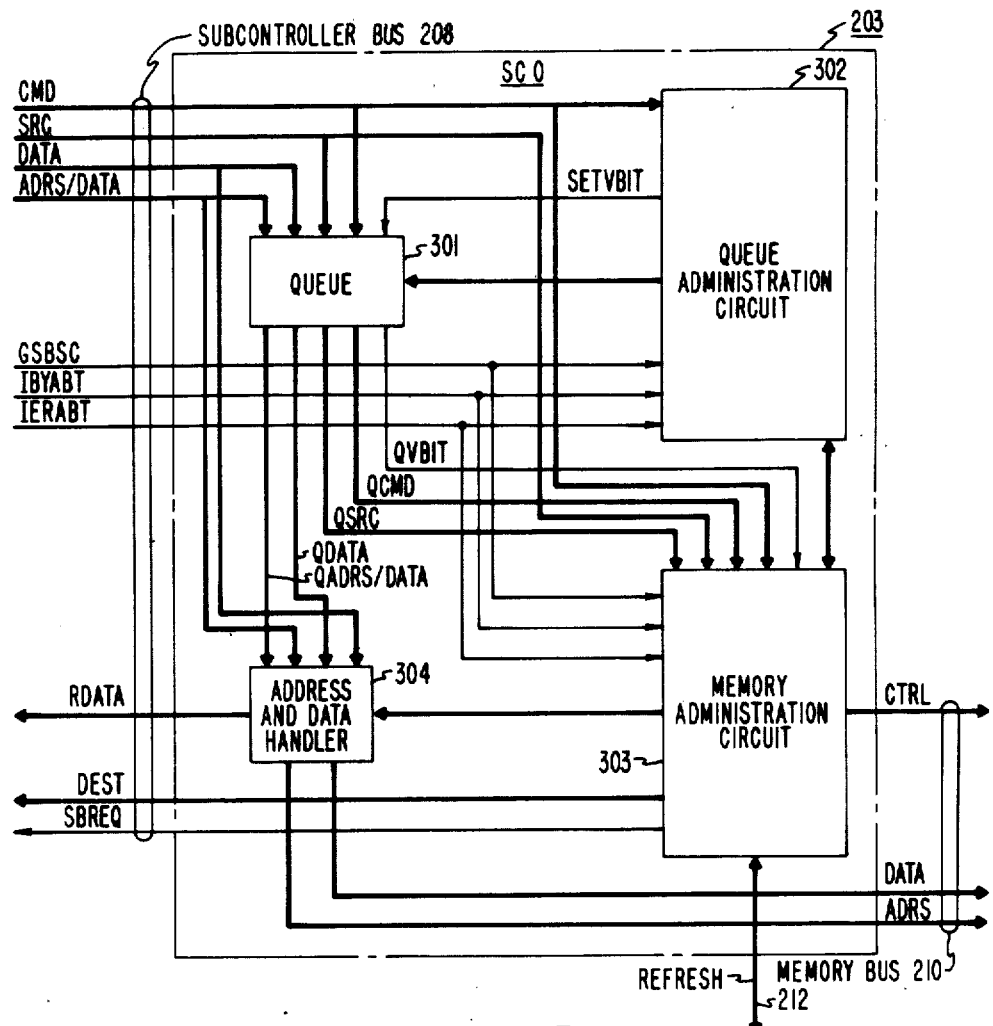
FIG. 3 a block diagram of a subcontroller of the main store unit of FIG. 2.
Figure 7:
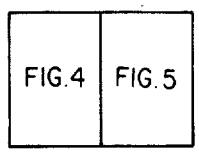

Turning to the operation of the subcontrollers 203 and 204, attention is directed to FIG. 3. FIG. 3 shows in block diagram form the general structure of the subcontroller 203. The subcontroller 204 is identical, and hence the discussion of FIG. 3 applies to both controllers 203 and 204.

The subcontroller 203 includes a memory administration circuit 303, which is directly responsible for executing read, write, and refresh operations on the memory module 205. For this purpose, the memory administration circuit 303 generates appropriate control signals on a CTRL bus of the memory bus 210. The control signals include timing, error-indicating, maintenance, and operation-type signals. Memory administration circuits are known in the art.

The memory administration circuit 303 also directs the operation of an address and data handler 304. The handler 304 is substantially a conventional circuit which cooperates with the circuit 303 in executing memory requests on the memory module 205. In the case of a write request, it receives the memory request address and data, performs error checking on the address and data, decodes the address into memory row, column, array, and chip select signals, generates Hamming information on the data, and provides the Hamming information, data, and decoded address to the memory module 205 on DATA and ADRS buses of the memory bus 210. In the case of a read request, the handler 304 receives the memory request address, performs error checking thereon, decodes the address, and provides the decoded address to the memory module 205. The handler 304 also receives data from the memory module 206 in response to a memory read request, performs error checking and correction on the data, and outputs the corrected data on an RDATA bus of the subcontroller bus 208 for transmission to the system bus interface 202. At the same time, the memory administration circuit 303 outputs a system bus request and a destination code on a SBREQ signal line and a DST bus, respectively, of the subcontroller bus 208 to accompany the data and enable the system bus interface 202 to send the data to the correct unit on the system bus 108. The circuit 303 uses as the destination code the source code (SRC) it received as part of the memory read request.

The subcontroller 203 also includes an information store organized as a queue 301, whose operation is controlled by a queue administration circuit 302. If the memory administration circuit 303 is busy when the system bus interface 202 gates a request to the subcontroller 203 over the subcontroller bus 208, the address (ADRS/DATA), data (DATA), command (CMD), and source code (SRC) fields of the request are stored in the queue 301. If the memory administration circuit 303 is idle and the queue 301 is empty when the request is received, the request by-passes the queue 301: the command and source code fields are sent directly to the memory administration circuit 303, the address and data are sent directly to the handler 304, and the request is processed immediately. When the memory administration circuit 303 and handler 304 complete a request, the memory administration circuit 303 checks with the queue administration circuit 302 whether the queue 301 is holding any memory requests. If so, the circuit 303 retrieves the request from the queue 301 for processing. The command and source code portions of the retrieved request, along with a validity flag (discussed below), are gated to the memory administration circuit 303, while the address and data portions of the retrieved request are gated to the handler 304.

Figure 6:
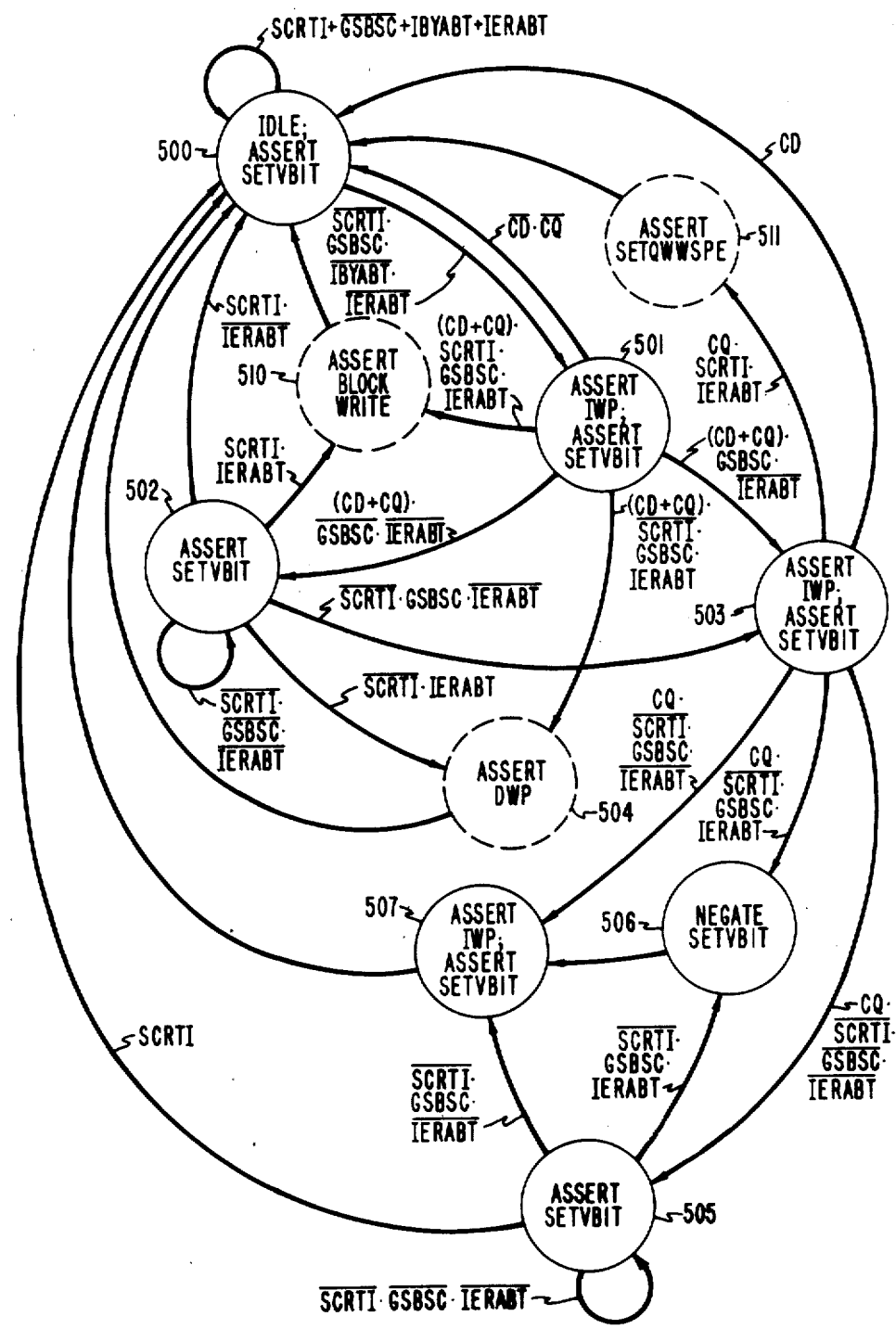
FIG. 6 is a state diagram of the queue sequencer and register control of FIG. 4B.

The operation of the memory administration circuit 303 and of the queue administration circuit 302 is controlled to a great degree by three control signals incoming from the system bus interface 202: the "gate system bus to subcontroller" (GSBSC) signal which the system bus interface 202 issues to whichever one of the subcontrollers 203 and 204 that is responsible for processing a memory request, and the "input busy abort" (IBYABT) and the "input error abort" (IERABT) signals which the system bus interface 202 issues to both subcontrollers 203 and 204 to invalidate a transaction. Thus the signal lines that carry the IERABT and IBYABT signals determine the validity of transactions. During the first and second bus cycles of a transaction, the queue administration circuit 302 stores contents of the subcontroller bus 208 in the queue 301 but retains them only if it receives the GSBSC signal unaccompanied by either the IBYABT or the IERABT signal and if the circuit 303 is not ready to receive the contents directly from the bus 208. During the second or subsequent bus cycle of a double word or quad-word memory write request, the circuit 302 also discards the previously-stored first portion of the request from the queue 301 if it receives the GSBSC signal accompanied by the IERABT signal. And during the last bus cycle of a quad-word memory write request, if the circuit 303 is not ready to receive the request directly from the bus 208, the circuit stores the contents of the bus 208, representing the last portion of the request, in the queue 301 upon receipt of the GSBSC signal, but sets a validity flag that is associated in the queue 301 with that request to an invalid state if the GSBSC signal is accompanied by the IERABT signal. Further aspects of the operation of the circuits 302 and 303 under influence of these control signals are discussed below in conjunction with FIGS. 4A–B and 6.

Figure 4:
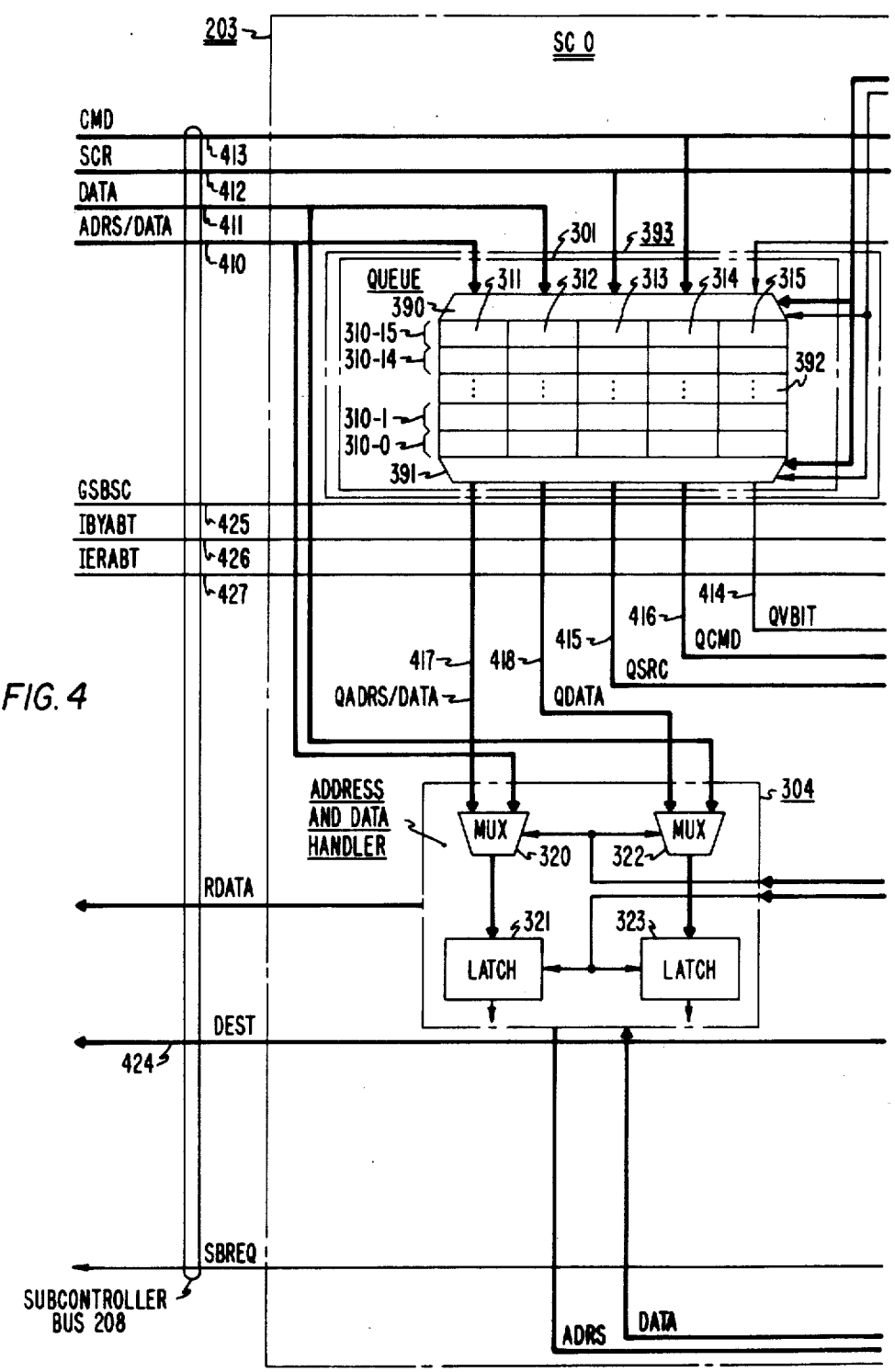
FIGS. 4A and 4B are an expanded block diagram of the relevant portions of the subcontroller of FIG. 3.
Figure 5:
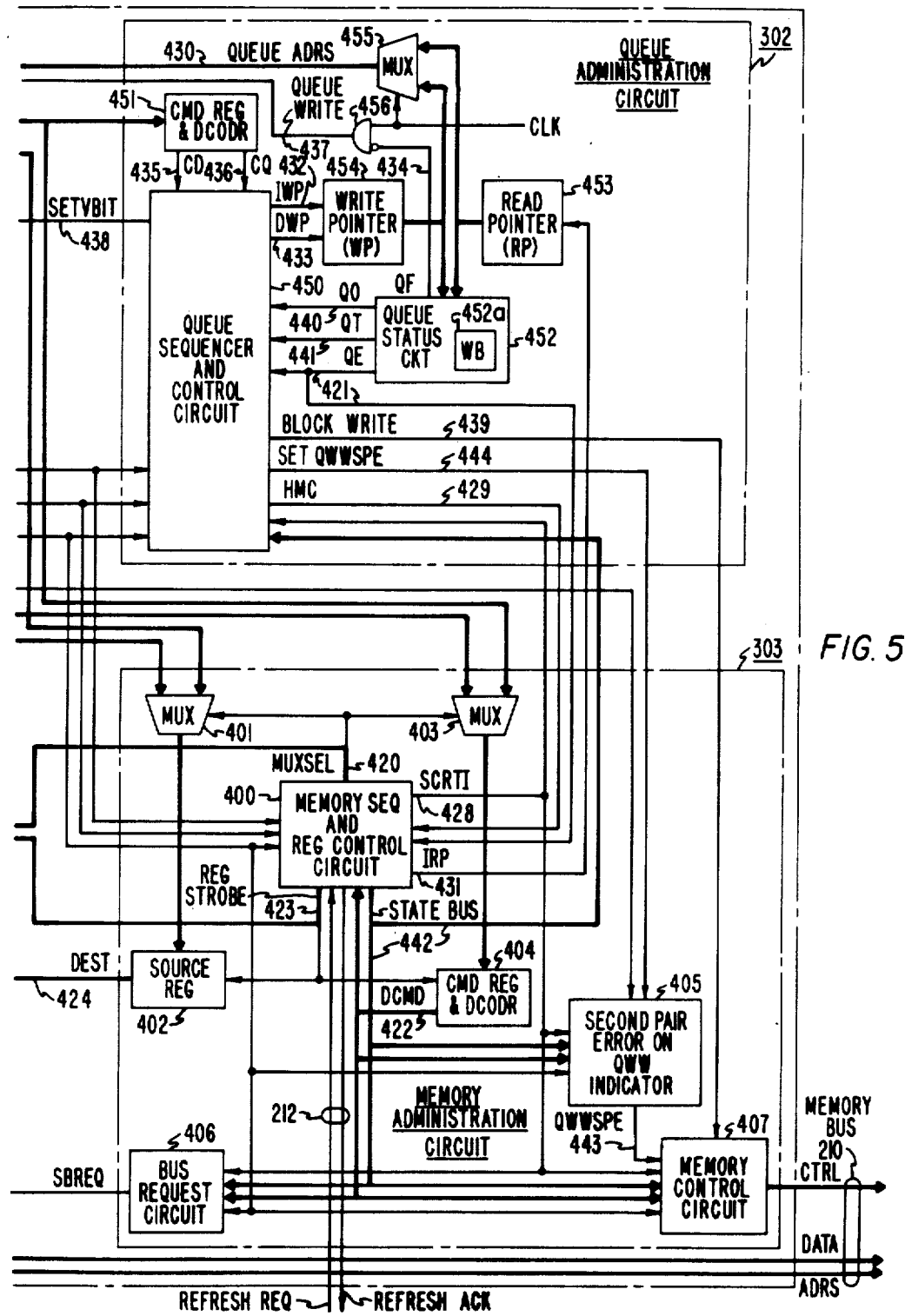
FIG. 5 is a diagram showing the arrangement of FIGS. 4A and 4B to form a complete figure.

Turning now to FIGS. 4A and 4B, they show the structure of the subcontroller 203 of FIG. 3 is greater detail. Considering first FIG. 4A, it shows the organization of the queue 301. The queue 301 is implemented as a circular buffer in a conventional memory device 393 that comprises a memory array 392, memory write circuitry 390 and memory read circuitry 391. For ease of reference, the memory device 393 will henceforth generally be referred to as the queue 301. The queue 301 holds a series of memory requests in the sequence in which they are received by the subcontroller 203. In this illustrative example, the queue 301 is sixteen storage locations 310-0 through 310-15 deep. Each location 310 holds information transferred across the system bus 108 and the subcontroller bus 208 during a single system bus cycle. Because a memory request transaction may occupy a plurality of bus cycles—up to three in this illustrative example, as has been described above—a single queue entry, representing a single memory request, occupies up the three storage locations 310. Each storage location 310 holds one part of the queue entry. Read-modify-write requests, byte, half-word, and single word write requests, and read requests of all sizes, are treated as single-word requests. Their transfer occupies a single system bus cycle, and hence they occupy a single storage location 310. Double word write requests use two storage locations 310, and quad-word write requests use three storage locations 310.

The storage locations 310 are each subdivided into a plurality of fields 311-314 which correspond with the fields of a memory request. The fields of a memory request in turn correspond with, and are conveyed to the queue 301 by, buses 410-413, respectively, of the same name of the subcontroller bus 208. The ADRS/-DATA field 311 of the first location of the locations 310-0 through 310-15 which is occupied by a request stores the address of the memory request. The field 311 of subsequent locations 310 occupied by a request stores a word of data of double word and quad-word write memory requests. The DATA field 312 of the first location 310 occupied by a request stores the data word of a single word, half-word, or byte write, or an RMW memory request, and is left empty for memory read requests and double-word and quad-word write memory requests. The field 312 of subsequent locations 310 occupied by a request stores a word of data of double-word and quad-word write requests The SRC field 313 of the first location 310 occupied by a request stores the source code of the memory request. The field 313 is empty in subsequent locations 310 occupied by the request. The CMD field 314 of the first location 310 occupied by a request stores the command of the memory request. The field 314 is likewise empty in subsequent locations 310 occupied by the request. In addition to the fields 311-314, each storage location 310 includes a validity flag (V) field 315. The V field 315 of a location 310 is used to indicate the validity of a quad-word write memory request when the location 310 holds the last part thereof.

Attention is next turned to the queue administration circuit 302, shown in FIG. 4B. The queue administration circuit 302 includes a read pointer (RP) 453 and a write pointer (WP) 454 to the queue 301. The pointers 453 and 454 point to the head end and tail end, respectively, of the queue 301. The read pointer 453 points to the first head end location 310 that holds a memory request part. More particularly, the read pointer 453 is a register containing the address of the location 310 that holds the part of a memory request that is to be read out from the queue 301 by the memory read circuit 393 and supplied to the circuits 303 and 304 for processing. The read pointer 453 is controlled by an IRP signal line 431 from the memory administration circuit 303. When the circuits 303 and 304 have received the contents of the location 310 pointed to by the pointer 453, the circuit 303 issues a signal on the IRP line 431 to increment the contents of the pointer 453, thereby enabling the circuitry 393 to read out the contents of the next location 310 of the queue 301. Retrieval of information from location 310 previously pointed to by the pointer 453 is considered to have freed that location, so this next location 310 is now considered to be the first head end location to hold a memory request part.

The write pointer 454 points to the first tail end location 310 that is free to store a memory request part. More particularly, the write pointer 454 is a register containing the address of the location 310 that is to be written next by the storage circuitry 390 with a portion of a memory request incoming from the subcontroller bus 208. The write pointer 454 is controlled by IWP and DWP signal lines 432 and 433 from a queue sequencer and control circuit 450 of the queue administration circuit 302. When the circuitry 390 stores a memory request part in the location 310 pointed to by the pointer 454 and that part is not to be discarded, the circuit 450 issues a signal on the IWP signal line 432 to increment the contents of the pointer 454 to point to the next free tail end location 310, thus enabling the circuitry 390 to write this next location 310. The circuit 302 effectively discards the stored request part and frees the location 310 pointed to by the pointer 454 by failing to increment the pointer 454, causing it to remain pointing to the same location 310. This results in the current contents of the location 310 being overwritten by the circuitry 390 with the next-received memory request part. The circuit 450 issues a signal on the DWP line 433 to decrement the contents of the pointer 454 and to thereby also discard the contents of the previously-written location 310 from the queue 301 and to free that location 310 to store another memory request part.

Contents of the read and write pointers 453 and 454 are displayed at their output ports which are connected to input ports of a multiplexer 455. Output port of the multiplexer 455 is connected to a QUEUE ADRS bus 430 leading to the queue 301. The multiplexer 455 is controlled by a CLK signal line which supplies clock signals that have the same frequency of the system bus cycles and a 50 percent duty cycle. The low portion of a clock signal causes the multiplexer 455 to connect the output of the read pointer 453 to the QUEUE ADRS bus 430 while the high portion of the clock signal causes the multiplexer 455 to connect the output of the write pointer 454 to the QUEUE ADRS bus 430.

The CLK signal line is also connected through an AND gate 456 to a QUEUE WRITE signal line 437 leading to the queue 301. A low signal on the QUEUE WRITE line 437 is interpreted by the circuits 390 and 391 as a read signal, while a high signal on the QUEUE WRITE signal line 437 is interpreted by the circuits 390 and 391 as a write signal. Thus, during each system bus cycle, the queue 301 receives an address from the read pointer accompanied by a read command during one half of the cycle to cause the queue 301 to be read, and receives an address from the write pointer accompanied by a write command during the other half of the cycle to cause the queue 301 to be written.

The output ports of the read and write pointers 453 and 454 are also connected to input ports of a queue status circuit 452 of the queue administration circuit 302. The circuit 452 compares the contents of the two pointers 453 and 454 and generates signals indicative of their relative status. Because the queue 301 is implemented as a circular buffer, the queue status circuit 452 administers an internal wraparound bit (WB) 452a that indicates whether or not the pointers 453 and 454 are on the same or a different wrap of the buffer. The circuit 452 sets the bit 452a when the write pointer 454 is incremented and its contents make a transition from the address of the last location 310-15 of the buffer to the first location 310-0 of the buffer. The circuit 452 clears the bit 452a when the write pointer is decremented and its contents make a transition from the address of the first location 310-0 of the buffer to the address of the last location 310-15 of the buffer, or when the read pointer 453 is incremented and it contents make a transition from the address of the last location 310-15 of the buffer to the first location 310-0 of the buffer.

The circuit 452 generates output signals based on the status of the bit 452a and the status of the pointers 453 and 454. When the bit 452a is cleared and the write pointer 454 contents exceed the contents of the read pointer 453 by one, the circuit 452 generates a signal on a QO signal line 440 to indicate that the queue 301 has one location 310 occupied by memory requests. When the bit 452a is cleared and the write pointer 454 contents exceed the contents of the read pointer 453 by two, the circuit 452 generates a signal on a QT signal line 441 to indicate that the queue 301 has two locations 310 occupied by memory requests. When the bit 452a is cleared and the contents of the pointers 453 and 454 are equal, the circuit 452 generates a signal on a QE signal line 421 indicating that the queue 301 is empty. And when the bit 452a is set and the contents of the pointers 453 and 454 are equal, the circuit 452 generates a signal on a QF signal line 434 to indicate that the queue 301 is full and all locations 310 are occupied by memory requests.

The QF signal line 434 is connected to a second, inverted, input of the AND gate 456. Assertion of the QF signal line 434 disables the AND gate 456 and blocks the write signal from reaching the queue 301, thereby preventing information from being stored in the queue 301 when the queue 301 is full and unable to store any more information.

The queue administration circuit 302 also includes a command register and decoder 451, whose input port is connected to the CMD bus 413 of the subcontroller bus 208. The register and decoder 451 stores and decodes the command portion of an incoming memory request. The register and decoder 451 determines whether the request is a quad-word write, a double-word write, or a single system bus cycle transaction. If the request is a double-word write, the register and decoder 451 asserts a CD signal line 435. If the request is a quad-word write, the register and decoder 451 asserts a CQ signal line 436. Lack of assertion of either line 435 or 436 indicates a single bus cycle transaction.

The queue sequencer and control circuit 450, mentioned above, of the queue administration circuit 302 directly controls the storage activities of the queue 301, primarily by manipulating the write pointer 454. The circuit 450 is a sequential state machine, whose operation is defined by the state diagram of FIG. 6. The operation of the circuit 450 is considered next, in conjunction with FIGS. 4A-B and 6.

At the start of a system bus transaction, the circuit 450 is in IDLE state 500. The circuit 450 is connected to the queue 301 by a SETVBIT line 438 which the circuit 450 uses to set and reset the valid bits 315 of the locations 310. Because receipt of an invalid memory request is the exception and most received requests are valid, the circuit 450 expects receipt of a valid request. Therefore in the idle state 500 the circuit 450 uses the line 438 to preset to the valid state the valid bit 315 of the location 310 pointed to by the write pointer 454.

The circuit 450 makes state transitions at the end of a system bus cycle. During the first system bus cycle of the transaction, the circuit 450 monitors the status of the GSBSC line 425, the IBYABT line 426, the IERABT line 427, and an SCRTI signal line 428 from the memory administration circuit 303. If the GSBSC line 425 is negated, i.e., not asserted, indicating that the destination of the system bus transaction is not the subcontroller 203 and hence the information conveyed by the transaction need not be stored in the queue 301, or if the SCRTI signal 428 line is asserted, indicating that the circuits 303 and 304 are accepting the information conveyed by the transaction directly and hence the information need not be stored in the queue 301, or if the IERABT line 427 or the IBYABT line 426 is asserted, indicating that the transaction is invalid, i.e., is being aborted, and hence information conveyed thereby should not be stored in the queue 301, the circuit 450 remains in the idle state 500 and does not increment the write pointer 454. The queue 301 has received a write signal on the QUEUE WRITE signal line 437 and has written the contents of the subcontroller bus 208 into the location 310 pointed to by the write pointer 454, but because the circuit 450 does not increment the write pointer 454, the receipt of the next write signal by the queue 301 overwrites the contents of the location 310 pointed to by the write pointer 454 with new contents. Hence information written into the location 310 pointed to by the write pointer 454 is effectively discarded from the queue 301, and that location 310 is freed to store information received during the next system bus cycle unless the write pointer 454 is incremented.

When in the idle state 500 the circuit 400 finds the GSBSC line 425 asserted and the SCRTI, IERABT and IBYABT signal lines 424, 427, and 426 negated, indicating that a valid, unaborted, memory request intended for this subcontroller 203 has been received by the subcontroller 203 over the subcontroller bus 208 but the circuit 303 is busy processing another request and therefore unable to receive the request directly, the circuit 450 enters state 501, leaving the just-received request stored in the queue 301.

In the state 501 the circuit 450 asserts the IWP line 432 to increment the write pointer 454, thereby preventing destruction in the queue 301 of the portion of the memory request that was just stored in the location 310 that had been pointed to by the write pointer 454. The incremented write pointer 454 points to the next free location 310 at the tail end of the queue 301. After incrementing the pointer 454, the circuit 450 asserts the SETVBIT line 438 to again preset to the valid state the validity bit 315 of the location 310 pointed to by the incremented write pointer 454.

The circuit 400 then checks the CD and CQ signal lines 435 and 436 incoming from the command register and decoder 451. If the memory request is not a quad-word or double-word write, the transaction is a single system bus cycle transaction, and hence transfer of the memory request is completed. Hence the circuit 450 returns to the idle state 500 to await the next system bus transaction.

If the transaction is conveying a quad-word or a double-word write request, only the first part of the request has been transferred to, and stored in, the queue 301 during the first system bus cycle. Hence the circuit 450 remains in the state 501 to await receipt of the next portion of the request during the next system bus cycle.

While in the state 501, assertion of the SCRTI line 428 from the memory administration circuit 303 indicates to the circuit 450 that the circuit 303 is ready to process the request that is currently being received and that it has read out from the queue 301 the first portion of the request that was just stored by the circuit 450—hence the queue 301 is empty. When the circuit 303 has begun to process this request, but the transaction is being aborted during receipt of the second part of the request, as indicated by assertion of the GSBSC and the IERABT signal lines 425 and 427, it is too late to just discard the request from the queue 301. Therefore, the circuit 450 leaves the state 501 and returns to the idle state 500, via pseudo-state 510. A pseudo-state is not a regular state, such as the state 501, because the controller 450 does not spend a full system bus cycle therein, but passes therethrough only transitorily. In the pseudo-state 510 the circuit 450 asserts a BLOCK WRITE signal line 439 leading to the circuit 303 to block the circuit 303 from writing the memory.

If in the second bus cycle of the transaction, while the circuit 450 is in the state 501, the SCRTI line 428 remains deasserted but the GSBSC and IERABT signal lines 425 and 427 are asserted, indicating that the second portion of the request is being received by the subcontroller 203 but the transaction is being aborted and the circuit 303 has not yet begun processing this request, the circuit 450 leaves the state 501 and returns to the idle state 500, via pseudo-state 504 to discard the request from the queue 301.

In the pseudo-state 504 the circuit 450 asserts the DWP line 433 to decrement the write pointer 454, thereby to discard the first part of the request from the queue 301. The location 310 pointed to by the decremented write pointer 454 is now considered to be the next free location 310 at the tail end of the queue 301. The circuit 450 then returns to the idle state 500.

If in the second bus cycle of the transaction, while the circuit 450 is in the state 501, the IERABT line 427 remains negated but the GSBSC line 425 is asserted, indicating that the second portion of a valid memory request is being received, the circuit 450 enters state 503, leaving the just-received second part of the request stored in the queue 301.

Finally, if in the second bus cycle of the transaction the GSBSC and IERABT lines 424 and 427 remain negated, indicating essentially a "wait" cycle in that a second portion of the memory request is not received, the circuit 450 enters a state 502 to await receipt of the second portion of the request in a subsequent bus cycle. In the state 502 the circuit 450 keeps the SETVBIT line 438 asserted. The circuit 450 generally remains in the state 502 for as long as the GSBSC, IERABT, and SCRTI lines 425, 427, and 428 remain negated.

While the circuit 450 is in the state 502, the circuit 303 can catch up with processing the backlog of requests stored in the queue 301. Combinatorial logic circuits of the circuit 450 therefore monitor the progress that the circuit 303 is making in processing requests. The state of processing of a request by the circuit 303 is displayed by the circuit 303 on a STATE bus 442 and conveyed thereby to the circuit 450.

While the circuit 450 is in the state 502, if the STATE bus 442 indicates that the circuit 303 is ready to start processing a new request and the QO line 440 indicates that there is only one occupied location 310 in the queue 301, this means that the controller 303 is ready to process the double- or quad-word write request which is currently being received. It is not advisable to allow the controller 303 to proceed, in case the request should be aborted. Hence the circuit 450 asserts an HMC signal line 429 leading to the circuit 303, to hold up, stop, the circuit 303 and prevent it from proceeding until the circuit 450 leaves the state 502.

In the state 502, assertion of the SCRTI and IERABT lines 428 and 427 indicates to the circuit 450 that the transaction that is in progress is being aborted, but that the circuit 303 has already begun processing the request being conveyed by this transaction. Hence it is too late to discard the request from the queue 301, and the circuit 450 responds to this condition by returning to the idle state 500 via the pseudo-state 510 to assert the BLOCK WRITE line 439 and thereby prevent the circuit 303 from executing the invalid memory write request on the memory.

If in the third or subsequent bus cycle of the transaction, while the circuit 450 is in the state 502, the circuit 303 empties the queue 301 and becomes ready to accept the rest of the request directly from the bus 208, indicated by assertion of the SCRTI line 428 while the IERABT line 427 remains deasserted, the circuit 450 returns to the idle state 500.

If in the state 502 the circuit 450 finds the SCRTI line 428 not asserted and the IERABT line 427 asserted, indicating that the transaction that is in progress is being aborted and processing of the request conveyed thereby to the circuit 303 has not yet begun, the circuit 450 returns to the idle state 500, via the pseudo-state 504 to discard the request from the queue 301, as was described previously.

If in the state 502 the circuit 450 finds the SCRTI and IERABT lines 428 and 427 negated and the GSBSC line 425 asserted, indicating receipt during a valid transaction of the second part of a request that the circuit 303 has not yet begun to process, the circuit 450 enters the state 503, leaving the just-received second portion of the request stored in the queue 301.

In the state 503, the circuit 450 asserts the IWP line 432 to increment the write pointer 454, thereby preventing destruction of the second part of the request in the queue 301. The incremented write pointer 454 points to the next free location 310 at the tail end of the queue 301. The circuit 450 then asserts the SETVBIT line 438 to preset to the valid state the validity bit 315 of the location 310 pointed to by the incremented pointer 454.

The circuit 450 then checks the output of the command register and decoder 451. If the CD line 435 is asserted, indicating that the memory request is a double-word write, the circuit 450 knows that the transaction is completed and hence it returns to the idle state 500 to await the next system bus transaction. Otherwise the circuit 450 remains in the state 503 to await receipt of the last portion of a quad-word write in the next system bus cycle.

While the circuit 450 is in the state 503, during receipt of a quad-word write request, assertion of the SCRTI line 428 again indicates to the circuit 450 that the circuit 303 has begun to process this quad-word write request. When this is the case and the transaction is being aborted, as indicated by assertion of the IERABT line 427, it is too late to prevent the circuit 303 from executing the aborted request on the memory by asserting the BLOCK WRITE line. This is because the circuit 303 may already be in the process of writing the first received pair of words in the memory, and interruption of the write cycle may detrimentally interfere with an orderly conclusion of the write operation. Therefore the circuit 450 leaves the state 503 and returns to the idle state 500 via a pseudo-state 511. In the pseudo-state 511 the circuit 450 asserts a SETQWWSPE signal line 444 to inform the circuit 303 that an error abort signal has been encountered while awaiting receipt of the second pair of data words of a quad-word write transaction. In response to this information, the circuit 303 can terminate execution of the request in an orderly manner and try to minimize damage done thereby to contents of the memory 201.

If in the third or subsequent bus cycle of the transaction, while the circuit 450 is in the state 503, the IERABT and SCRTI and lines 427 and 428 are negated and the GSBSC line 425 is asserted, indicating receipt of the third portion of the valid quad-word write request which the circuit 303 has not begun to process, the circuit 450 enters state 507, leaving the just-received portion of the request stored in the queue 301.

In the state 507 the circuit 450 asserts the IWP line 432 to increment the write pointer 454, thereby preventing destruction of the third portion of the request in the queue 301. The incremented write pointer 454 points to the next free location 310 at the tail end of the queue 301. The circuit 450 then asserts the SETVBIT line 438 to preset to the valid state the valid bit 315 of the location 310 pointed to by the incremented write pointer 454. The circuit 450 then returns to idle state 500.

If in the third or subsequent bus cycle of the transaction, while the circuit 450 is in the state 503, the SCRTI line 428 is not asserted and the GSBSC and IERABT lines 425 and 427 are asserted, it indicates receipt of the last portion of the quad-word write request which is being aborted and which request the circuit 303 has not yet begun to execute on the memory. However, the circuit 450 cannot merely discard this aborted request from the queue 301, because the circuit 303 may have already begun to process this request. Hence the circuit 450 enters state 506 to mark this portion of the request invalid in the queue 301.

In the state 506 the circuit 450 negates the SETVBIT line 438 to reset to the invalid state the valid bit 315 of the location 310 pointed to by the write pointer 454, thereby to indicate to the circuit 303 that the request has been invalidated.

In the state 506 the circuit again monitors the STATE bus 442 to determine the state of processing of a request by the circuit 303. When the bus 442 indicates that the circuit 303 is ready to accept the second portion of the quad-word write request and the QO line 440 indicates that there is only one occupied location in the queue 301, this indicates that the controller 303 is processing the just-received busy-aborted quad-word write request. Again, it is not advisable to allow the controller 303 to proceed until the circuit 450 leaves the state 506 and the controller 303 can detect that the request has been invalidated. Hence the circuit 450 again asserts the HMC signal line 429, until it leaves the state 506.

From the state 506 the circuit 450 enters state 507 to increment the write pointer 454 and preset to the valid state the validity bit 315 of the location 310 pointed to by the incremented pointer 454, before returning to the idle state 500.

Finally, if in the third or subsequent bus cycle of the transaction, while the circuit 450 is in the state 503, the GSBSC, IERABT and SCRTI lines 425, 427, and 428 are negated, indicating essentially a "wait" cycle in that the third portion of the memory request is not received, the circuit 450 enters a state 505 to await receipt of the final portion of the request in a subsequent bus cycle. In the state 505 the circuit 450 maintains asserted the SETVBIT line 438, in anticipation of a valid transaction. The circuit 450 generally remains in the state 505 for as long as the GSBSC and IERABT lines 425 and 427 remain negated.

While the circuit 450 is in the wait state 505, the circuit 303 can catch up with processing the backlog of requests in the queue 301. Hence in the state 505 the circuit 450 once again monitors the STATE bus 442 to determine the state of processing of a request by the circuit 303. When the bus 442 indicates that the circuit 303 is ready to accept the second portion of the quad-word write and the QO line 440 indicates that there is only one occupied location in the queue 301, this indicates that the controller 303 is beginning to process the quad-word write which is currently being received. Also, when the bus 442 indicates that the circuit 303 is ready to start processing a new request and the QT line 441 indicates that there are only two occupied locations in the queue 301, this means that the controller 303 is ready to process the quad-word write request which is currently being received. It is not advisable to allow the controller 303 to proceed in either case, in the event that the transaction be invalidated. Hence the circuit 450 asserts the HMC line 429 to hold up the circuit 303, until the circuit 450 leaves the state 505.

If in the state 505 the circuit 450 detects assertion of the SCRTI signal line 428, indicating that the circuit 303 is processing the request that is currently being received and is ready to receive the last portion thereof directly, the circuit 450 leaves the state 505 and returns to the idle state 500.

While in the state 505, if the circuit 450 receives GSBSC and IERABT signals while the SCRTI line 428 is negated, indicating invalidation of the current transaction while the circuit 303 is processing queue 301 entries, the circuit 450 enters the state 506 to mark the request invalid in the queue 301.

Finally, while in the state 505, if the circuit 450 receives a GSBSC signal while the SCRTI and IERABT lines 428 and 427 are negated, indicating receipt of the last portion of the valid quad-word write request while the circuit 303 is processing queue 301 entries, the circuit 450 enters the state 507 to store the last portion of the request in the queue 301.

The memory administration circuit 303 and the address and data handler 304 are considered next. As was noted above, such circuits are known in the prior art. Therefore only those portions and operational characteristics of the circuits 303 and 304 that aid in understanding the operation of the queue 301 and the queue administration and control circuit 302 will be discussed here.

The subcontroller bus 208 is not only connected to the queue 301 to allow storage of incoming memory requests therein, but also to the circuit 303, as shown in FIG. 4B, and to the circuit 304, as shown in FIG. 4A, to allow these circuits to receive an incoming memory request directly. And the circuits 303 and 304 are also connected by queue (Q) buses to the queue 301 to allow these circuits to take their inputs from the queue 301.

The SRC and CMD buses 412 and 413 of the subcontroller bus 208 are connected to first input ports of multiplexers 401 and 403, respectively, of the memory administration circuit 303. Second input ports of the multiplexers 401 and 403 are connected by QSRC and QCMD buses 415 and 416 to outputs of the SRC and CMD fields 313 and 314, respectively, of the queue 301. Similarly, the ADDRS/DATA and DATA buses 410 and 411 of the subcontroller bus 208 are connected to first input ports of multiplexers 320 and 322, respectively, of the address and data handler 304, while second input ports of the multiplexers 320 and 322 are connected by QADRS/DATA and QDATA buses 417 and 418, respectively, to outputs of the ADRS/DATA and DATA fields 311 and 312, respectively, of the queue 301. Selection of an input port of each multiplexer 401, 403, 320, and 322 for connection to its output port is controlled by a memory sequencer and register control circuit 400 of the memory administration circuit 303 via MUX SEL signal lines 420.

The circuit 400 includes a sequencer that counts the elapsed memory bus 210 cycles of the execution by the memory administration circuit 303 of a memory request. The current state of the sequencer of the circuit 400 thus represents the stage of processing of a memory request that the memory administration circuit 303 is currently in. The state of the sequencer of the circuit 400 is displayed on the STATE bus 442. Execution of memory requests has different requirements in different memories. Hence, the particular structure and states of the sequencer are a function of the particular memory devices from which the memory module 206 is constructed.

The circuit 400 generates control signals based on the state of its sequencer and the state of various input signals. When the memory administration circuit 303 is ready to receive a portion of a memory request, or a new memory request, the circuit 400 examines the status of the QE signal line 421 incoming from the queue administration circuit 302 to determine whether the queue 301 is empty or holding at least a portion of a memory request for the circuit 303 to process.

If the queue 301 is not empty, the circuit 400 causes each of the multiplexers 401, 403, 320, and 322 to connect the respective queue bus 415–418 to its output port. This enables the memory administration circuit 303 and the address and data handler 304 to receive information read out from the queue 301.

If the queue 301 is empty, i.e., the QE line 421 is asserted, the circuit 400 asserts the SCRTI signal line 428 leading to the queue administration circuit 302 to inform it that the circuit 303 is ready to take input directly from the subcontroller bus 208, and causes each of the multiplexers 320, 322, 401, and 403 to connect the respective bus 410-413 of the subcontroller bus 208 to its output port. A memory request, or a portion thereof, is permitted thereby to bypass the queue 301 and to reach the address and data handler 304 and the memory administration circuit 303 directly from the subcontroller bus 208.

Latch registers 321 and 323 of the address and data handler 304 have input ports connected to the output ports of the multiplexers 320 and 323, respectively, to receive therefrom the address and data information of a memory request. The registers 321 and 323 are each a plurality of memory words deep, to enable them to store a complete memory request, including one that occupies a plurality of system bus cycles such as a double-word write or a quad-word write request. The registers 321 and 323 then supply the latched address and data to other circuitry of the handler 304 for processing. Input and output functions of the registers 321 and 323 are controlled by the circuit 400 via REG STROBE control lines 423.

In the memory administration circuit 303, a source register 402 has an input port connected to the output port of the multiplexer 401 to receive therefrom and store the source code of a memory request. Output port of the register 402 is connected to a DEST bus 424 of the subcontroller bus 208, to allow use of the source code of a memory read request as the destination code of the memory response to that request. Input and output functions of the source code register 402 are controlled by the circuit 400 via the REG STROBE control lines 423.

Also in the circuit 303, a command register and decoder 404 has an input port connected to the output port of the multiplexer 403 to receive therefrom and store the command code of a memory request. The command register and decoder 404 displays the decoded command at its output port on a DCMD bus 422 connected thereto. Input and output functions of the command register and decoder 404 are also controlled by the circuit 400 via the REG STROBE control line 423.

The DCMD bus 422 transports the decoded command from the command register and decoder 404 to the circuit 400 to advise the circuit 400 what kind of request is being processed so that the sequencer of the circuit 400 can proceed through the appropriate states. Inter alia, the decoded command advises the circuit 400 of the number of portions that make up the request so that the circuit 400 may cause the latch registers 321 and 232 to latch and process the whole request.

When the circuit 303 is accepting a memory request directly from the subcontroller bus 208, i.e., while the SCRTI line 428 is asserted, the circuit 400 is responsive to signals on the GSBSC, IBYABT, and IERABT signal lines 425-427. When the circuit 303 is accepting memory requests from the queue 301, the circuit 400 is unresponsive to signals on the lines 425-427. In either case, however, the circuit 400 is responsive to memory refresh requests periodically incoming from the refresh circuit 207 on a REFRESH REQ signal line of the refresh bus 212, which cause the circuit 400 to stop accepting memory requests from both the queue 301 and the subcontroller bus 208 and to generate sequencer states necessary for performance of memory refresh operations. Once the memory refresh operation is initiated, the circuit 400 so advises the refresh circuit 207 over a REFRESH ACK signal line of the refresh bus 212. When the refresh operation is completed, the circuit 400 returns to processing memory requests at the point at which it left off.

When processing queue 301 entries, the circuit 400 is stopped, prevented from changing state, by assertion of the HMC line 429 incoming from the queue sequencer and control circuit 450. When the circuit 400 is stopped, processing of memory requests ceases. The circuit 400 is restarted and processing of memory requests zesumes from the point at which it ceased upon negation of the HMC line 429.

The circuit 303 includes a "SECOND PAIR ERROR 0N QWW" circuit 405. The circuit 405 receives and examines the status of various conditions to determine whether a quad-word write request becomes invalidated upon receipt by the main store unit 104 of the second pair of data words. The circuit 405 is implemented as an indicator, a flag, that is raised when a quad-word write request is invalidated upon receipt of the third portion of the quad-word write request. The indicator 405 is connected to the SETQWWSPE line 444 incoming from the queue sequencer and control circuit 450, the QVBIT line 414 leading from the queue 301, the SCRTI line 428 and the STATE bus 442 from the circuit 400, the DCMD bus 422 from the command register and decoder 404, and the IERABT line 427. While the circuit 303 is processing an entry of the queue 301, i.e., the SCRTI line 428 is not asserted, either assertion of the SETQWWSPE line 444 or conveyance of an invalid V bit 315 value by the QVBIT line 414 from the queue 301 results in setting the indicator 405. When the circuit 303 is receiving a request directly from the subcontroller bus 208, i.e., the SCRTI line 428 is asserted, the indicator 405 is set when the DCMD bus 422 indicates a quad-word write request, the STATE bus 442 indicates that the circuit 400 is ready to receive the second pair of data words of the request, and the IERABT line 427 is asserted.

The indicator 405 is reset when the STATE bus 442 indicates that the circuit 400 is ready to accept and begin processing a new request.

Output of the indicator 405 is connected via a QWWSPE signal line 443 to an input of a memory control circuit 407 of the circuit 303. The memory control circuit 407 is that portion of the circuit 303 that generates control signals on the CTRL bus of the memory bus 210 as a function of the operation indicated by the DCMD bus 422. The circuit 407 takes as further inputs the DCMD bus 422, the IERABT line 427, the STATE bus 442, the SCRTI line 428 and the BLOCK WRITE line 439 from the queue sequencer and control circuit 450. Assertion of the BLOCK WRITE line 439 prevents the circuit 407 from generating a write command and hence prevents it from writing the memory 201. Assertion of the QWWSPE line 443 causes the circuit 407 to complete writing into the memory 201 the first word pair of a quad-word write request but to not write the second word pair of the request. The second word pair of the quad-word write request is thereby effectively discarded by the circuit 407. The circuit 407 is responsive to the IERABT line 427 only when the SCRTI line 428 is asserted. Assertion of the IERABT signal line 427 then causes the circuit 407 to block the write of memory for the request part that is being processed.

The circuit 303 further includes a bus request circuit 406. It is the function of this circuit to generate a system bus request signal on the SBREQ line of the subcontroller bus 208 when the circuit 303 is ready to return a response to a read request. The circuit 406 is connected to the DCMD bus 422 so that it can determine when a processed request is a read request. And it is connected to the STATE bus 442 so that it can determine when the circuit 303 is ready to respond to the request.

The circuit 406 is also connected to the SCRTI line 428 and the IERABT line 427. The circuit 406 is responsive to the IERABT line 427 only when the SCRTI line 428 is asserted. Assertion of the IERABT line 427 then causes the circuit 407 to not generate a system bus request signal on the SBREQ line, as aborted read requests require no response.

Of course, it should be understood that various changes and modifications to the illustrative embodiment described above will be apparent to those skilled in the art. Such changes and modifications can be made without departing from the scope and the spirit of the invention and without diminishing its attendant advantages. It is therefore intended that such changes and modifications be covered by the following claims.

What is claimed is:

1. An arrangement comprising:
storage means organized as a queue having a head end and a tail end, the storage means including a plurality of storage locations for holding queue entries;
means for storing a queue entry received for processing, in a free at least one location at the tail end of the queue;
means for determining whether the stored tail end entry is invalid;
means responsive to the determining means for freeing the at least one location holding an invalid tail end entry to hold a new tail entry;
means for retrieving a stored queue entry for processing from the head end of the queue;
means for determining whether the queue is empty; and
means, coupled to the retrieving means and cooperative with the means for determining whether the queue is empty, for obtaining a retrieved entry from the retrieving means when the queue is determined not to be empty, and for receiving an entry for processing directly, by bypassing the queue, when the queue is determined to be empty.

2. The arrangement of claim 1 wherein the freeing means comprise
means responsive to the determining means for discarding the invalid tail end entry, to avoid processing the invalid entry.

3. An arrangement comprising:
storage means organized as a queue having a tail end, the storage means including a plurality of storage locations for sequentially holding a series of queue entries, each entry having at least one part and each location for holding one part;
means for pointing to the first free location at the tail end of the queue;
means for storing a first part of a queue entry in the location pointed to by the pointing means;
means for determining validity of the stored first part; and
means responsive to the determining means for causing the pointing means to point to the next free location at the tail end of the queue when the stored first part is determined to be valid, and for causing the pointing means to remain pointing to the same location when the first part is determined to be invalid.

4. The arrangement of claim 3 wherein
the storage means are organized as a queue having a tail end and a head end; and wherein
the arrangement further comprises
second pointing means for pointing to the first location holding a queue entry part at the head end of the queue;
means for retrieving the part from the location pointed to by the second pointing means; and
means responsive to retrieval of the part by the retrieving means for causing the second pointing means to point to the next location holding a queue entry part at the head end of the queue.

5. The arrangement of claim 4 further comprising
means cooperative with both pointing means for determining whether the queue is empty of entry parts; wherein
the means for storing include
means for storing another part of a queue entry having a plurality of parts, in the location pointed to by the pointing means; wherein
the validity determinign means include
means for determining validity of the stored other part; and wherein
the causing means include
means, responsive to the validity determining means and to the queue-empty determining means, for causing the pointing means to point to the next free location at the tail end of the queue when the other part is determined to be valid, for causing the pointing means to point to the location holding the first part of the entry when the other part is determined to be invalied and the queue is determined not to be empty, and for generatiing a signal indicative of an invalid entlry when the other part is determined to be invalid and the queue is determined to be empty.

6. The arrangement of claim 3 wherein
the means for storing include
means for storing another part of a queue entry having a plurality of parts, in the location pointed to by the pointing means; wherein p1 the determining means include
means for determining validity of the stored other part; and wherein
the causing means include
means responsive to the determining means for causing the pointing means to point to the next free location at the tail end of the queue when the other part is determined to be valid, and for causing the pointing means to point to the location holding the first part of the entry when the other part is determined to be invalid.

7. The arrangement of claim 6 wherein
a storage location has associated therewith a flag for indicating the validity of its contents; wherein
the means for storing include means for storing yet another part of a queue entry having a plurality of parts, in the location pointed to by the pointing means; wherein the determining means include means for determining validity of the stored yet another part; and wherein the causing means include means responsive to the determining means for causing the validity flag of the location pointed to by the pointing means to indicate invalid contents when the yet another part is determined to be invalid, and for causing the pointing means to point to the next free location at the tail end of the queue.

8. The arrangement of claim 7 wherein the storage means are organized as a queue having a tail end and a head end; and wherein the arrangement further comprises second pointing means for pointing to the first location holding a queue entry part at the head end of the queue;

means for retrieving the part from the location pointed to by the second pointing means;

means for examining the validity flag of the location holding the part retrieved by the retrieving means;

means responsive to the examining means for causing the retrieved part to be discarded when the examined validity flag indicates invalid contents; and means responsive to retrieval of the part by the retrieving means for causing the second pointing means to point to the next location holding a queue entry part at the head end of queue.

9. A control apparatus for interfacing a resource to at least one unit issuing tasks to the resource, comprising:

storage means organized as a queue having a head end and a tail end, the storage means including a plurality of storage locations for holding resource tasks;

means responsive to receipt of a resource task from a unit for storing the received task in a free at least one location at the tail end of the queue;

means for determining whether the task stored at the tail end is invalid;

means responsive to the determining means for freeing the at least one location holding an invalid tail end task to store another task received by the storing means, thereby discarding the invalid task from the queue;

means for retrieving a stored task, for execution on the resource, from the head end of the queue;

means for determining whether the queue is empty; and means for executing tasks on the resource, coupled to the retrieving means and to the at least one using unit for receiving tasks therefrom, the executing means responsive to the means for determining whether the queue is empty for receiving for execution a retrieved task from the retrieving means when the queue is determined to be not empty, and for receiving for execution a task directly from a using unit when the queue is determined to be empty.

10. The apparatus of claim 9 wherein the resource comprises a memory and wherein the resource tasks are memory storage and retrieval requests.

11. A control apparatus for interfacing a resource to at least one unit issuing tasks to the resource, comprising:

storage means organized as a queue having a head end and a tail end, the storage means including a plurality of storage locations for sequentially holding a series of resource tasks, each task having at least one part and each location for holding one part;

first means for pointing to the first free location at the tail end of the queue;

means for storing a first part of a task received from a unit in the location pointed to by the first pointing means;

means for determining validity of the stored first part;

means responsive to the determining means for causing the first pointing means to point to the next free location at the tail end of the queue when the stored first part is determined to be valid, and for causing the first pointing means to remain pointing to the same location when the first part is determined to be invalid;

second means for pointing to the first location holding a task part at the head end of the queue;

means for retrieving a task part, for execution on the resource, from the location pointed to by the second pointing means; and means responsive to retrieval of the part by the retrieving means for causing the second pointing means to point to the next location holding a task part at the head end of the queue.

12. The arrangement of claim 11 wherein the means for storing include means for storing another part of a received task having a plurality of parts, in the location pointed to by the first pointing means; wherein the determining means include means for determining validity of the stored other part; and wherein the means for causing the first pointing means include means responsive to the determining means for causing the first pointing means to point to the next free location at the tail end of the queue when the other part is determined to be valid, and for causing the first pointing means to point to the location holding the first part of the task when the other part is determined to be invalid.

13. The arrangement of claim 12 further comprising means cooperative with pointing means for determining whether the queue is empty of task parts; and wherein the means responsive to the means for determining validity of the stored other part include means, responsive to the means for determining validity of the stored other part and to the means for determining whether the queue is empty, for causing the first pointing means to point to the next free location at the tail end of the queue when the other part is determined to be valid, for causing the first pointing means to point to the location holding the first part of the task when the other part is determined to be invalid and the queue is determined not to be empty, and for generating a signal indicative of an invalid task when the other part is determined to be invalid and the queue is determined to be empty.

14. The arrangement of claim 12 wherein each storage location has associated therewith a flag for indicating the validity of its contents; wherein the means for storing include means for storing yet another part of a received task having a plurality of parts, in the location pointed to by the first pointing means; wherein the determining means include means for determining validity of the stored yet another part; and wherein the means for causing the first pointing means include means responsive to the determining means for causing the validity flag of the location pointed to by the first pointing means to indicate invalid contents when the yet another part is determined to be invalid, and for causing the first pointing means to point to the next free location at the tail end of the queue.

15. The arrangement of claim 14 further comprising:

means for examining the validity flag of the location holding the part retrieved by the retrieving means; and means responsive to the examining means for causing the retrieved part to not be executed on the resource when the examined validity flag indicates invalid contents.

16. A computing system comprising:

a resource;

at least one resource using unit for making requests of the resource;

storage means organized as a queue having a head end and a tail end, the storage means including a plurality of storage locations for holding resource requests;

means resonsive to receipt of a resource request from a resource using unit for storing the received request in a free at one location at the tail end of the queue;

means for determining whether the request stored at the tail end is invalid;

means responsive to the determining means for freeing the at least one location holding an invalid tail end request to store another request received by the storing means, thereby discarding the invalid request from the queue;

means for retrieving a stored request, for execution on the resource, from the head end of the queue;

means for determining whether the queue is empty; and means for executing requests on the resource, coupled to the retrieving means and to the at least one using unit for receiving therefrom resource requests, the executing means responsive to the means for determining whether the queue is empty for receiving for execution a retrieved request from the retrieving means when the queue is determined to be not empty, and for receiving for execution a resource request directly from a using unit when the queue is determined to be empty.

17. The system of claim 16 wherein the resource comprises a memory and wherein the resource requests are memory storage and retrieval requests.

18. The system of claim 16 wherein the freeing means further comprise means responsive to the executing means for freeing the at least one location holding a tail end request when the executing means receive a resource request from a using unit.

19. A computing system comprising:

a resource;

at least one resource using unit for making requests of the resource;

storage means organized as a queue having a head end and a tail end, the storage means including a plurality of storage locations for sequentially holding a series of resource requests, each request having at least one part and each location for holding one part;

first means for pointing to the first free location at the tail end of the queue;

means for storing a first part of a resource request received from a unit in the location pointed to by the first pointing means;

means for determining validity of the stored first part;

means responsive to the determining means for causing the first pointing means to point to the next free location at the tail end of the queue when the stored first part is determined to be valid, and for causing the first pointing means to remain pointing to the same location when the first part is determined to be invalid;

second means for pointing to the first location holding a request part at the head end of the queue;

means for retrieving a request part, for execution on the resource, from the location pointed to by the second pointing means; and means responsive to retrieval of the part by the retrieving means for causing the second pointing means to point to the next location holding a request part at the head end of the queue.

20. The system of claim 19 wherein the means for storing include means for storing another part of a received request having a plurality of parts, in the location pointed to by the first pointing means; wherein the determining means include means for determining validity of the stored other part; and wherein the means for causing the first pointing means include means responsive to the determining means for causing the first pointing means to point to the next free location at the tail end of the queue when the other part is determined to be valid, and for causing the first pointing means to point to the location holding the first part of the request when the other part is determined to be invalid.

21. The system of claim 20 further comprising means cooperative with both pointing means for determining whether queue is empty of request parts; and wherein the means responsive to the means for determining validity of the stored other part include means, responsive to the means for determining validity of the stored other part and to the means for determining whether the quueue is empty, for causing the first pointing means to point to the next free location at the tail end of the queue when the other part is determined to be valid, for causing the first pointing means to point to the location holding the first part of the request when the other part is determined to be invalid and the queue is determined not to be empty, and for generating a signal indicative of an invalid request when the other part is determined to be invalid and the queue is determined to be empty.

22. The system of claim 20 wherein each storage location has associated therewith a flag for indicating the validity of its contents; wherein the means for storing include means for storing yet another part of a received request having a plurality of parts, in the location pointed to by the first pointing means; wherein the determining means include means for determining validity of the stored yet another part; and wherein the means causing the first pointing means include means responsive to the determining means for causing the validity flag of the location pointed to by the first pointing means to indicate invalid contents when the yet another part is determined to be invalid, and for causing the first pointing means to point to the next free location at the tail end of the queue.

23. The system of claim 22 further comprising:

means for examining the validity flag of the location holding the part retrieved by the retrieving means; and means responsive to the examining means for causing the retrieved part to not be executed on the resource when the examined validity flag indicates invalid contents.

24. The system of claim 19 further comprising:

means for receiving resource requests from the at least one unit;

means for comparing the first pointing means with the second pointing means to determine whether the queue is empty;

means for executing requests on the resource, the executing means for indicating when they are ready to receive a request for execution;

means for selectively coupling the executing means to one of the retrieving means and the receiving means, the coupling means responsive to the comparing means and to the executing means for coupling the executing means to the receiving means to enable the executing means to receive requests for execution directly from the receiving means when both the queue is determined to be empty and the executing means indicate that they are ready to receive a request for execution, and otherwise for coupling the executing means to the retrieving means to enable the executing means to receive retrieved requests for execution.

25. The system of claim 24 wherein the means for causing the first pointing means further comprise means responsive to the comparing means and to the executing means for causing the first pointing means to remain pointing to the same location when both the queue is determined to be empty and the executing means indicate that they are ready to receive a request for execution.

26. A method of administering a queue in a computing system having a resource, at least one resource using unit for making requests of the resource, and storage apparatus organized as the queue having a tail end, the storage apparatus including a plurality of storage locations for holding resource requests, the method comprising the steps of:

storing a resource request received from a unit in a free at least one location at the tail end of the queue, determining whether the request stored at the tail end is invalid; and freeing the at least one location holding a tail end request determined to be invalid to store another received request, thereby discarding the invalid request from the queue.

27. The method of claim 26 in a system wherein the storage apparatus is organized as the queue further having a head end, further comprising the steps of retrieving a stored request from the head end of the queue; and executing the retrieved request on the resource.

28. The method of claim 27 wherein the step of storing is preceded by the steps of determining whether the queue is empty; and executing on the resource a resource request received from a unit when the queue is determined to be empty; and wherein the steps of storing, determining, freeing, retrieving, and executing the retrieved request are performed when the queue is determined not to be empty.

29. A method of administering a queue in a computing system having a resource, at least one resource using unit for making requests of the resource, each request having at least one part, storage apparatus organized as the queue having a head end and a tail end, the storage apparatus including a plurality of storage locations for sequentially holding a series of resource requests, each location for holding one request part, a head end pointer for pointing to the first location holding a request part at the head end of the queue, and a tail end pointer pointing to the first free location at the tail end of the queue, the method comprising the steps of:

storing a first part of a resource request received from a unit in the location pointed to by the tail end pointer;

determining validity of the stored first part;

causing the tail end pointer to point to the next free location at the tail end of the queue when the stored first part is determined to be valid;

causing the tail end pointer to remain pointing to the same location when the first part is determined to be invalid;

retrieving a stored part from the location pointed to by the head end pointer;

causing the head end pointer to point to the next location holding a part at the head end of the queue;

selectively repeating the steps of retrieving and causing the head end pointer to point, to retrieve all of the requests from the queue; and executing the retrieved request on the resource.

30. The method of claim 29 further comprising the steps of:

storing another part of the received request, the request having a plurality of parts, in the location pointed to by the tail end pointer;

determining validity of the stored other part;

causing the tail end pointer to point to the next free location at the tail end of the queue when the other part is determined to be valid; and causing the tail end pointer to point to the location holding the first part of the request when the other part is determined to be invalid.

31. The method of claim 30 in a computing system wherein each storage location of the storage apparatus has associated therewith a flag for indicating the validity of its contents, the method further comprising the steps of:

storing yet another part of the received request in the location pointed to by the tail end pointer;

determining validity of the stored yet another part;

causing the validity flag of the location pointed to by the tail end pointer to indicate invalid contents when the yet another part is determined to be invalid; and causing the tail end pointer to point to the next free location at the tail end of the queue.

32. The method of claim 31 wherein the step of retrieving is followed by the steps of examining the validity flag of the location holding the retrieved part; and discarding the retrieved part when the examined validity flag indicates invalid contents; and wherein the step of executing comprises the step of executing the retrieved request on the resource when the examined validity flag indicates valid contents.

33. The method of claim 29 in a system further having apparatus for indicating when the queue is empty and apparatus for executing requests on the resource and for indicating readiness to receive a request for execution, wherein the steps of storing, determining, and causing the tail end pointer to point, are performed in response to indication that the executing apparatus is not ready to receive a request;

wherein the steps of retrieving, causing the head end pointer to point, and selectively repeating, are performed in response to indication that the queue is not empty and the executing apparatus is ready to receive a request; and the method further comprising the step of executing a resource request received from a unit, without storing the request in the queue, in response to indication that the queue is empty and the executing apparatus is ready to receive a request.

* * * * *

UNITED STATES PATENT AND TRADEMARK OFFICE
CERTIFICATE OF CORRECTION

PATENT NO. : 4,682,284

DATED : July 21, 1987

INVENTOR(S) : Eldred P. Schrofer

It is certified that error appears in the above-identified patent and that said Letters Patent is hereby corrected as shown below:

Column 20, line 51, "means; wherein pl the determining" should be --means; wherein -- (new paragraph) --the determining means include--;

Column 22, line 46, "means cooperative with pointing" should be --means cooperative with both pointing--;

Column 24, line 49, "termining whether queue is" should be --termining whether the queue is--.

Signed and Sealed this

Sixth Day of October, 1992

Attest:

DOUGLAS B. COMER

*Attesting Officer*  Acting Commissioner of Patents and Trademarks